(12) United States Patent
Connelly et al.

(10) Patent No.: US 11,807,466 B2
(45) Date of Patent: Nov. 7, 2023

(54) SCANNING SYSTEMS AND RELATED METHODS

(71) Applicant: IDSS Holdings, Inc., Armonk, NY (US)

(72) Inventors: James Michael Connelly, Medford, MA (US); Daniel S. Poder, Chestnut Hill, MA (US); Jeffrey J. Hamel, Methuen, MA (US)

(73) Assignee: IDSS Holdings, Inc., Armonk, NY (US)

(*) Notice: Subject to any disclaimer, the term of this patent is extended or adjusted under 35 U.S.C. 154(b) by 166 days.

(21) Appl. No.: 17/109,052

(22) Filed: Dec. 1, 2020

(65) Prior Publication Data

US 2021/0163231 A1  Jun. 3, 2021

Related U.S. Application Data

(60) Provisional application No. 62/942,695, filed on Dec. 2, 2019.

(51) Int. Cl.
*B65G 43/08* (2006.01)
*G01N 23/046* (2018.01)

(52) U.S. Cl.
CPC ........... *B65G 43/08* (2013.01); *G01N 23/046* (2013.01); *B65G 2203/0233* (2013.01); *B65G 2203/042* (2013.01); *G01N 2223/3307* (2013.01); *G01N 2223/419* (2013.01); *G01N 2223/643* (2013.01)

(58) Field of Classification Search
CPC ... A61B 6/4021; A61B 6/4014; A61B 6/4266; B65G 43/08; B65G 2203/0233; B65G 2203/042; G01N 23/046; G01N 2223/64; G01N 2223/3307; G01N 2223/419; G01N 2223/643
See application file for complete search history.

(56) References Cited

U.S. PATENT DOCUMENTS 10,451,567 B2 * 10/2019 Kaminski ............... B65G 47/46
10,737,122 B2 * 8/2020 Weidlich ............... A61N 5/1081
11,609,189 B2 * 3/2023 Prenn ..................... G01V 5/005
(Continued)

OTHER PUBLICATIONS

WO-2004031755-A2, Folded Array CT Baggage Scanner, Biijani R R, A61B6/482, Apr. 2004 (Year: 2004).*
(Continued)

*Primary Examiner* — Gene O Crawford
*Assistant Examiner* — Lester Rushin, III
(74) *Attorney, Agent, or Firm* — Wolf, Greenfield & Sacks, P.C.

(57) ABSTRACT

Scanning systems and related methods are provided. The scanning systems and methods may be computed tomography (CT) based scanning systems and methods. According to some aspects, the scanning systems have a reduced size compared to conventional scanning systems and may have similar throughput to some conventional scanning systems. According to some aspects, the scanning systems are reconfigurable into at least two scanning arrangements. Reduced size and/or reconfigurable scanning systems can allow an operator to dispose a scanning system in an environment that would not accommodate a conventional scanning system. Accordingly, the scanning systems described herein can provide enhanced security in some environments.

19 Claims, 14 Drawing Sheets

(56) References Cited

U.S. PATENT DOCUMENTS

2021/0145996 A1* 5/2021 Morton ................ A61L 2/26
2021/0181369 A1* 6/2021 Prabhu ............... G01V 5/0041

OTHER PUBLICATIONS

Sommer et al., Method and Apparatus for Improving Baggage Screening Examination, Sep. 22, 2005, WIPO, WO 2005/086616 A2 (see Office Action for pertinent pages) (Year: 2005).*
Pfeiler, Device For X-ray Computer Tomography Scanning of Parcels or Luggage, May 12, 1999, Germany, DE 19749783 A1, (see Office Action for pertinent pages) (Year: 1999).*
Biijani, Folded Array CT Baggage Scanner, Apr. 15, 2004, WIPO WO-2004/031755-A2 (see Office Action for pertinent pages) (Year: 2004).*

* cited by examiner

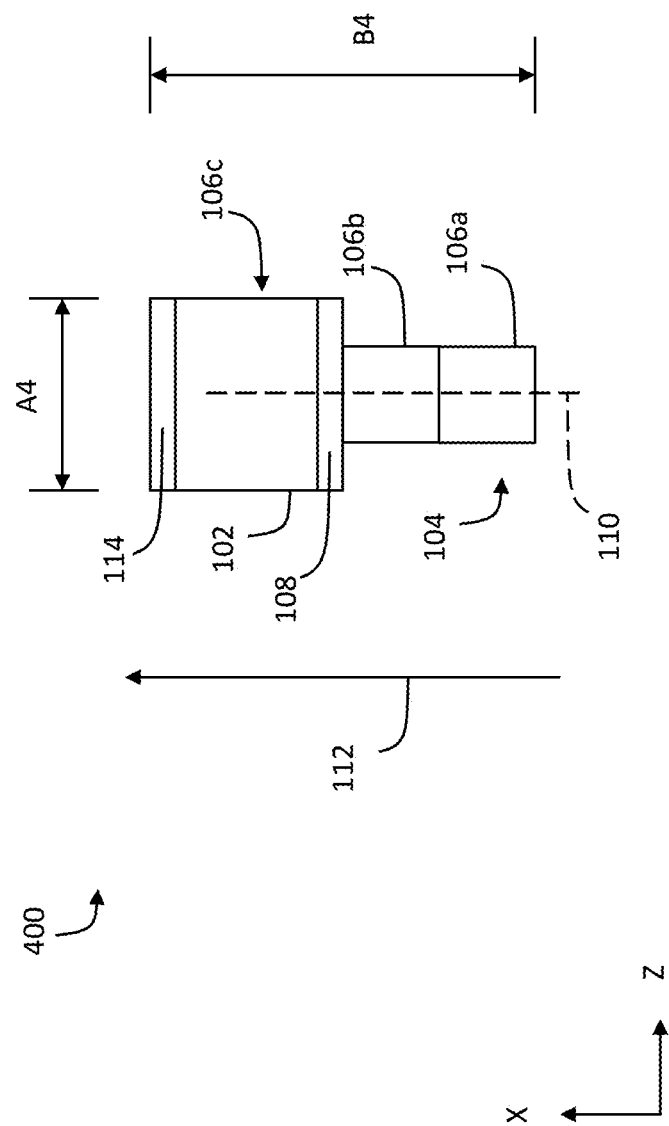

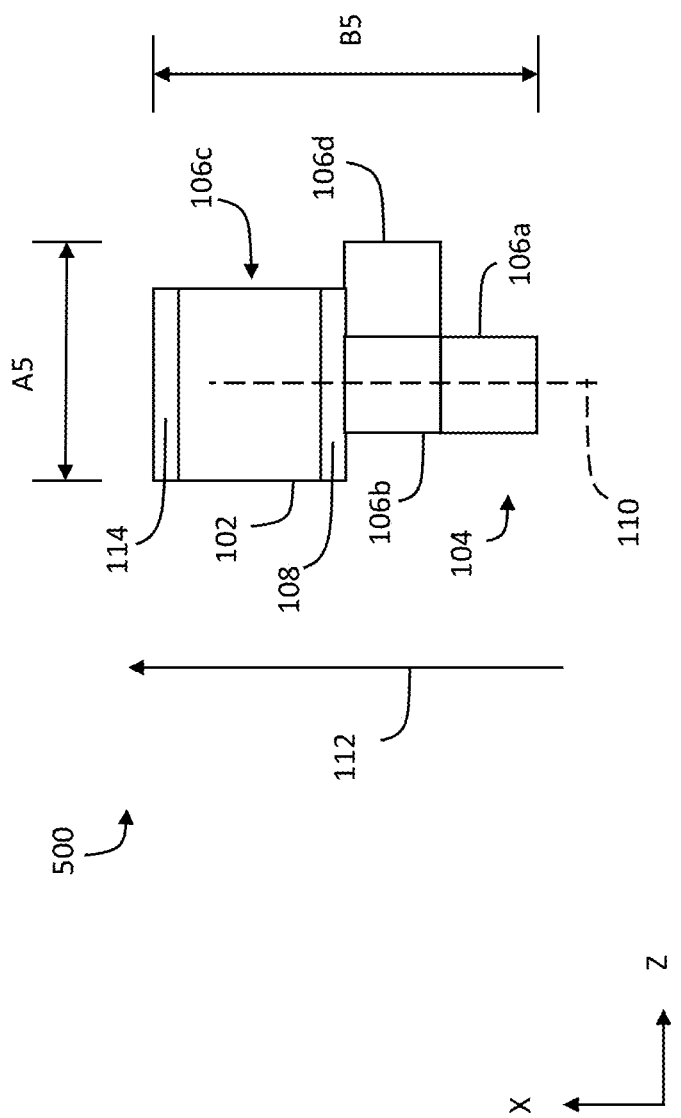

SCANNING SYSTEMS AND RELATED METHODS

RELATED APPLICATIONS

This application claims the benefit under 35 U.S.C. § 119(e) of U.S. Application Ser. No. 62/942,695, filed Dec. 2, 2019, titled "METHOD AND APPARATUS TO ADAPT CT SECURITY SCANNERS TO SMALL SPACES", which is incorporated herein by reference in its entirety.

BACKGROUND

Article screening is used in various security applications. For example, articles may be screened at airports or in other aviation environments. Systems used in article screening may use X-rays to scan articles.

SUMMARY OF THE DISCLOSURE

Scanning systems and related methods are provided. The scanning systems and methods may be computed tomography (CT) based scanning systems and methods. According to some aspects, the scanning systems have a reduced size compared to conventional scanning systems and may provide similar throughput to various conventional scanning systems even with a limited form factor. According to some aspects, the scanning systems are reconfigurable into at least two scanning arrangements. Reduced size and/or reconfigurable scanning systems can allow an operator to dispose a scanning system in an environment that would not accommodate a conventional scanning system. In some example, the scanning system can be constructed from modular elements enabling configuration not available in various conventional approaches, and in further example, reconfiguration of the scanning system into other architectures. In some settings, the scanning system can be configured to manage smaller form factors and corresponding reduction in radiation shielding area that may result. For example, the system can manage activation and de-activation of a radiation source based on positioning or movement of an item to be scanned. This is unlike conventional system that employ and require much larger shielding area to permit constant radiation. Accordingly, the scanning systems described herein can provide enhanced security in many environments that pose significant challenges for conventional systems.

According to aspects of the disclosure, there is provided a scanning system comprising a conveyor assembly, a scanner, and at least one processor. The at least one processor is configured to control the conveyor assembly to move at least one article at least one of into or out of the scanner and control the scanner to suspend radiation emission while the conveyor assembly is moving the at least one article at least one of into or out of the scanner.

In some embodiments, the scanner comprises at least one X-ray emitter and the at least one processor is configured to control the scanner to turn off the at least one X-ray emitter to suspend radiation emission. In some embodiments, the scanner further comprises at least one shield curtain, the at least one article displaces the at least one shield curtain when the conveyor assembly moves the at least one article into or out of the scanner, and the at least one processor is configured to control scanner to turn off the at least one X-ray emitter while the at least one article displaces the at least one shield curtain.

In some embodiments, the scanning system further comprises a sensor and the at least one processor is configured to determine a position of the at least one article using the sensor. In some embodiments, the at least one processor is configured to determine when to suspend radiation emission using the position of the at least one article determined using the sensor.

In some embodiments, the conveyor assembly is configured to move the at least one article along a first axis, the scanner comprises an article opening arranged along a second axis, and the first axis is not parallel to the second axis. In some embodiments, the first axis is perpendicular to the second axis. In some embodiments, the scanner comprises a single article opening and the conveyor assembly is configured to move the at least one article into and out of the scanner via the article opening. In some embodiments, the scanner comprises a removable shield arranged on a side of the scanner opposite to the article opening, the removable shield plugging an additional article opening. In some embodiments, the conveyor assembly is configured to move the at least one article along a first axis, and the scanner comprises a first article opening arranged along the first axis and a second article opening arranged along the first axis.

According to aspects of the disclosure, there is provided a scanning system comprising a scanner, a shielded tunnel, a conveyor assembly configured to move at least one article, and at least one processor configured to control the conveyor assembly to hold a first article in the shielded tunnel when the scanner scans a second article.

In some embodiments, the scanning system further comprises a sensor and the at least one processor is configured to determine a position of at least one of the first article or the second article using the sensor. In some embodiments, the at least one processor is configured to determine when to hold the first article in the shielded tunnel using the position of the at least one of the first article or the second article determined using the sensor.

In some embodiments, the at least one processor is configured to control the conveyor assembly to move the first article from the shielded tunnel directly to an uncovered portion of the scanning system and the uncovered portion is configured to allow retrieval of the article by an owner of the article. In some embodiments, the scanning system further comprises an indicator and the at least one processor is configured to control the indicator to provide a status of the first article held in the shielded tunnel to an operator of the scanning system.

According to aspects of the disclosure, there is provided a scanning system comprising a conveyor assembly configured to move articles along a first axis and a scanner comprising at least one article opening arranged along a second axis. The scanning system is reconfigurable between a first scanning arrangement and a second scanning arrangement.

In some embodiments, in the first scanning arrangement, the at least one processor is configured to control the conveyor assembly to move at least one article at least one of into or out of the scanner and control the scanner to suspend radiation emission while the conveyor assembly is moving the at least one article at least one of into or out of the scanner and, in the second scanning arrangement, the at least one processor is configured to control the conveyor assembly to hold a first article in a shielded tunnel when the scanner scans a second article.

In some embodiments, the first axis is parallel to the second axis in the first scanning arrangement and the first axis is not parallel to the second axis in the second scanning arrangement. In some embodiments, the scanner comprises a single article opening in the first scanning arrangement and the scanner comprises a first article opening and a second article opening in the second scanning arrangement. In some embodiments, the scanning system comprises a shielded tunnel coupled to the at least one article opening in the first scanning arrangement and the scanning system does not comprise a shielded tunnel coupled to the at least one article opening in the second scanning arrangement.

According to aspects of the disclosure, there is provided a scanning method comprising moving at least one article into or out of a scanner using a conveyor assembly and suspending radiation emission while the at least one article is moving at least one of into or out of the scanner.

In some embodiments, the method further comprises scanning the at least one article. In some embodiments, the method further comprises moving at least one article along a first axis, wherein scanning the at least one article comprises scanning the at least one article using a scanner comprising an article opening arranged along a second axis and the first axis is not parallel to the second axis. In some embodiments, moving at least one article into or out of a scanner comprises moving, using a conveyor, the at least one article into the scanner via an article opening and moving, using the conveyor, the at least one article out of the scanner via the article opening.

According to aspects of the disclosure, there is provided a scanning method, comprising scanning a first article and holding a second article in a shielded tunnel when scanning the first article.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

FIG. 4A is a top plan view of a scanning system, according to one exemplary embodiment;

FIG. 5A is a top plan view of a scanning system, according to one exemplary embodiment;

DETAILED DESCRIPTION

Figure 1:
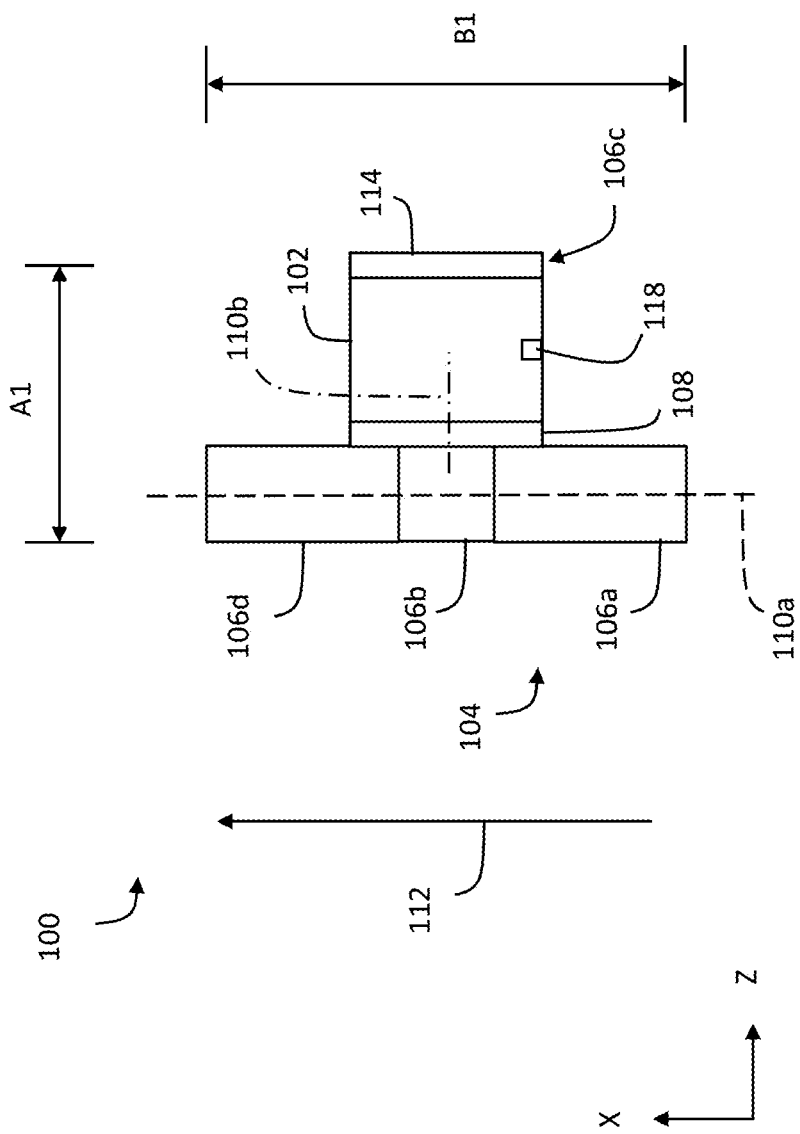
FIG. 1 is a top plan view of a scanning system, according to one exemplary embodiment.

According to aspects of the disclosure, scanning systems and scanning methods for use in physically small spaces and with improved throughput are provided. For example, the inventors have recognized that it may be advantageous to provide scanning systems in physically small spaces such as building lobbies, mobile trucks, or other physically small spaces. Some embodiments provide computed tomography (CT) scanners in physically small spaces.

In some embodiments, a scanning system may have a scanner that may suspend radiation emission while articles are being moved into and out of the scanner, thereby eliminating the need for shielded tunnels arranged at an article opening of a scanner, allowing the size of the scanning system to be reduced.

In some embodiments, a scanning system may have a conveyor assembly having multiple separately controllable conveyor segments that may hold a first article in a shielded tunnel while a second article is being scanned, eliminating the need for a dedicated article holding area, thereby allowing the size of the scanning system to be reduced. Holding the first article while continuing with scanning of the second article may also allow higher throughput than scanning systems that cannot hold articles without halting scanning because they only have a single conveyor.

CT based scanners may be used for inspecting articles such as baggage and parcels to determine the presence of prohibited items. For example, CT based scanners may be used in various environments, such as aviation security, including checked and carry-on baggage, building security, drug interdiction, theft prevention at high value manufacturing, for example, to prevent smuggling out of valuable items such as gemstones or high value integrated circuits, VIP protection, and other environments.

Many conventional CT based scanners were originally designed for an airport security environment and that they are designed to run at high article throughput speeds where space can be made to accommodate a large system footprint as well as room for and passenger processing. The inventors have recognized that in other environments, such as building security, theft prevention, and VIP protection, or smaller aviation checkpoints, conventional high throughput may not be necessary and providing, as a trade-off, a scanning system having a reduced footprint, would be advantageous.

CT based scanners may provide more information about the contents of an article than a conventional projection X-ray scanner. However, the size of a CT based scanner may also be much larger than the size of a conventional projection X-ray scanner. Some of the larger size is because a CT scanner may rotate X-ray emitters and detectors around articles as they are scanned. Rotating the emitters and detectors may require a larger cross-sectional dimension than a conventional X-ray projection scanner where X-ray emitters and detectors may be stationary in a tunnel of a projection scanning system. Additionally, because CT based systems may create a higher level of radiation, CT based systems may be longer than conventional X-ray projection systems developed for equivalent sized articles, for example, because additional shielding is required.

The inventors have recognized that a large portion of the length of a CT based system is tied up in the shielded tunnels of a scanning system, which may contain the radiation shield curtains of the system. The inventors have further recognized that additional length is consumed by conveyor segments that act as article holding areas, for example, to prevent access to an article while an operator is analyzing a scan of the article. Accordingly, the inventors have recognized that the length of a scanning system such as a CT based scanning system may be reduced by eliminating at least some shielded tunnels or article holding areas of the scanning system.

The inventors have recognized that by controlling the X-ray emission in coordination with the movement of articles under inspection, a scanning system may be provided with a shorter or absent shielded tunnel, because fewer radiation curtains may be required. The inventors have recognized that providing a shorter or absent shielded tunnel may provide a CT based scanning system that takes up less floor space and that may be more suitable for smaller physical locations, for example, smaller physical locations that may have lower throughput requirements.

According to some aspects, a scanning system may have no shielded tunnel. Further, the scanning system may also have only a single article opening. In such a system, radiation may only be emitted when an article is completely within the scanner of the system, which has its own radiation shielding, for example, shield curtains at its article openings. In various embodiments, a scanning system with no shielded tunnel may be provided as a scanning system with either a single article opening, for example, where articles move into and out of a scanner via a same article opening, or as scanning system with two articles openings, for example, where articles move into the scanner by a first opening, pass through the scanner, and move out of the scanner by a second opening.

A scanning system with no shielded tunnel may coordinate X-ray emission with movement of articles. For example, the scanning system may use at least one sensor to determine a position of an article and ensure that the position of the article is within the radiation curtains of a scanner when emission occurs. In an arrangement having only a single article opening, the length of the scanning system, including conveyor assemblies, may be reduced to approximately 12 feet, compared to a length of approximately 24 feet for a conventional CT based scanner.

The inventors have recognized that eliminating a shielded tunnel may increase throughput of the scanning system when coordinating x-ray emission with movement of articles. In some conventional systems, an article must transit the entire length of a shielded tunnel and most of the scanner. Most of this is dead time, when the scanner cannot work on a subsequent article. The inventors have recognized that by eliminating the shielded tunnel, a portion of this dead time is eliminated, thereby improving system throughput.

In some embodiments, throughput may be increased in a single article opening system by using a bidirectional conveyor, or an operator, to divert a first article off to the side to a holding area while an operator is analyzing the scan of the first article. In some embodiments, a bidirectional conveyor comprises a conveyor configured to move articles in two perpendicular directions. In some embodiments, a bidirectional conveyor is configured to move articles in forward and reverse along each of the perpendicular directions. While the first article is held, a second article may be moved into the scanner and scanned, thereby increasing throughput. In some embodiments, throughput may be increased in a single article opening system by adding a second paths for articles to be moved into the scanner. For example, a roller table may be included before the bidirectional conveyor, acting as a metering conveyor, and a second roller table may be offset position from the bidirectional conveyor. This allows a second article to be scanned while a scan of the first article is being analyzed, and also for a third article to be put in place, ready to be moved into the scanner when the second article is finished being scanned and moved the holding area.

According to some aspects, an article may be held in a shielded tunnel after exiting the scanner while another article is being scanned. According to some embodiments, by holding the article in the shielded tunnel, a dedicated article holding area may be eliminated. For example, articles may be stopped in a shielded tunnel at the exit of the scanner while an operator analyzes the scan of the article. Holding an article in the shielded tunnel while scanning another article may be achieved using separately controllable conveyor segments in the scanner and in the shielded tunnel in each section. Accordingly, a stoppage of the already scanned article can be accomplished while allowing subsequent bags to continue being scanned, thereby increasing throughput out of the system.

Holding articles in a shielded tunnel may prevent operators from visually seeing an article and its status. In some embodiments, there is at least one of a visual, audio, or tactile indicator provided by the system. For example, a visual indicator may be provided on the shielded tunnel. The indicator may provide a status of an article in the shielded tunnel to operators. For example, the indicator may comprise a multicolored light, such as a flashing light. When an article is awaiting an analysis decision, the light may provide a yellow light. When an article has received an analysis decision and is cleared, the light may provide a green light and the system may move the article out of the shielded tunnel. If an article is designated for search, the light may provide a red light, to indicate to operators that the article must be retrieved when it is moved out of the shielded tunnel. A viewing station of the system may indicate a current physical position of an article via an image on a screen. If an article is designated for search, the screen may indicate that the article must be retrieved and prevent moving on to a next article until the operator acknowledges the indication. Alternatively or additionally, the indicator may provide audio cues corresponding to the statuses listed above.

In an arrangement where articles are held in a shielded tunnel, the length of the scanning system may be reduced to approximately 21 feet, compared to a length of approximately 24 feet for a conventional CT based scanner. In some embodiments, the length of the scanning system may be shortened approximately 12% while maintaining most of the throughput of the system.

As shown in the exemplary embodiment of FIG. 1, scanning system 100 includes a scanner 102 and a conveyor assembly 104. Scanner 102 comprises an article opening 108 and a shield 114. Conveyor assembly 104 comprises a first conveyor segment 106a, a second conveyor segment 106b, a third conveyor segment 106c, and a fourth conveyor segment 106d. In some embodiments, scanning system 100 may not include any shielded tunnels at article openings.

Scanner 102 is configured to scan articles. In some embodiments, the scanner 102 may comprise at least one emitter, such as an X-ray emitter. In some embodiments, the scanner 102 may comprise at least one detector, such as an X-ray detector. In some embodiments, an emitter and detector of the scanner 102 may be configured to scan an article, for example, by taking an X-ray scan of an article. In some embodiments, the article is rotated or the emitter and detector are rotated to provide a three-dimensional scan. For example, a scanner may provide CT or similar scans.

Scanner 102 may be configured to suspend scanning when an article is moving into or out of the scanner 102. Scanner 102 may include at least one shield curtain arranged at article opening 108. When an article is moving through article opening 108, the article may displace the at least one shield curtain. When the shield curtain is displaced, it may fail to block any X-rays generated by an emitter. Accordingly, when an article is being moved, before the article displaces the at least one curtain, the scanner 102 may suspend scanning, such as by suspending radiation emission. For example, the scanner 102 may suspend scanning by turning off its X-ray emitters. When a scanner includes rotating emitters and detectors, the emitters and detectors may continue to rotate even when scanning is suspended and the emitters are turned off. As illustrated in FIG. 1, scanner 102 may include at least one sensor 118 configured to determine positions of articles. Sensor 118 may be omitted from other figures that show scanner 102 for clarity of illustration. The at least one sensor 118 may use the determined location to ensure that the X-ray emitters are not emitting radiation when articles are moving into or out of the scanner 102. By suspending scanning while moving articles, the need for shielded tunnels at article openings may be eliminated, and overall size of the scanning system 100 may be reduced.

The conveyor assembly 104 is configured to move articles along first axis 110a. The first axis 110a is arranged along the X direction. The article opening 108 is arranged along second axis 110b. The second axis 110b is arranged along the Z direction. The first axis 110a may be arranged not parallel to the second axis 110b. For example, in the illustrative embodiment of FIG. 1, the first axis 110a is perpendicular to the second axis 110b.

The conveyor assembly 104 comprises at least one conveyor segment. In the figures, two or more conveyor segments may be illustrated. However, in some embodiments, one conveyor segment may perform the functions described with respect to two or more conveyor segments illustrated in the figures. In other embodiments, two conveyors may perform the functions described with respect to one conveyor segment illustrated in the figures. In some embodiments, one or more conveyor segment may comprise passive rollers that do not propel articles.

Conveyor segment 106a is a conveyor segment configured to receive articles. For example, an operator of the scanning system 100 and/or an owner of an article may place an article on a conveyor segment configured to receive articles. A conveyor segment configured to receive articles may be configured to move articles to a subsequent conveyor segment, for example, conveyor segment 106b.

Conveyor segment 106b is a conveyor segment configured to move articles into and out of the scanner 102. A conveyor segment configured to move articles into and out of a scanner may receive articles from a preceding conveyor segment, such as conveyor segment 106a. A conveyor segment configured to move articles into and out of a scanner may move articles onto a subsequent conveyor, such as conveyor segment 106c, which in the illustrative embodiment is within the scanner 102, and into the scanner 102 via article opening 108. After articles are scanned, a conveyor segment 106b may move articles out of the scanner 102 via article opening 108. Conveyor segment 106b may then move articles to a subsequent conveyor segment, for example, conveyor segment 106d. In some embodiments, a conveyor segment configured to move articles into and out of a scanner may be a bidirectional conveyor, configured to move articles in both the X and Z directions.

Conveyor segment 106c is disposed in the scanner 102. A conveyor segment disposed in a scanner may be configured to move articles into and out of the scanner. A conveyor segment disposed in a scanner may be configured to receive articles from a preceding conveyor and provide articles to a subsequent conveyor.

Conveyor segment 106d is a conveyor segment configured to disseminate articles. For example, a conveyor segment configured to disseminate articles may be configured to allow an operator of a scanning system and/or an owner of an article to retrieve an article. A conveyor segment configured to disseminate articles may be configured to receive articles from a preceding conveyor.

In some embodiments, persons may travel along path 112. For example, in FIG. 1, the path 112 is arranged in the X direction. In some embodiments, the persons may be the owners of articles being scanned by scanning system 100. In some embodiments, the owners may be airline passengers, for example, airline passengers traversing airline security. In some embodiments, path 112 may represent a passenger flow in an aviation setting or guest flow in a building setting.

Scanning system 100 has a width A1 and a length B1. In some embodiments, width A1 may be approximately 8.5 feet or less. In some embodiments, length B1 may be approximately 16 feet or less.

Figure 2:
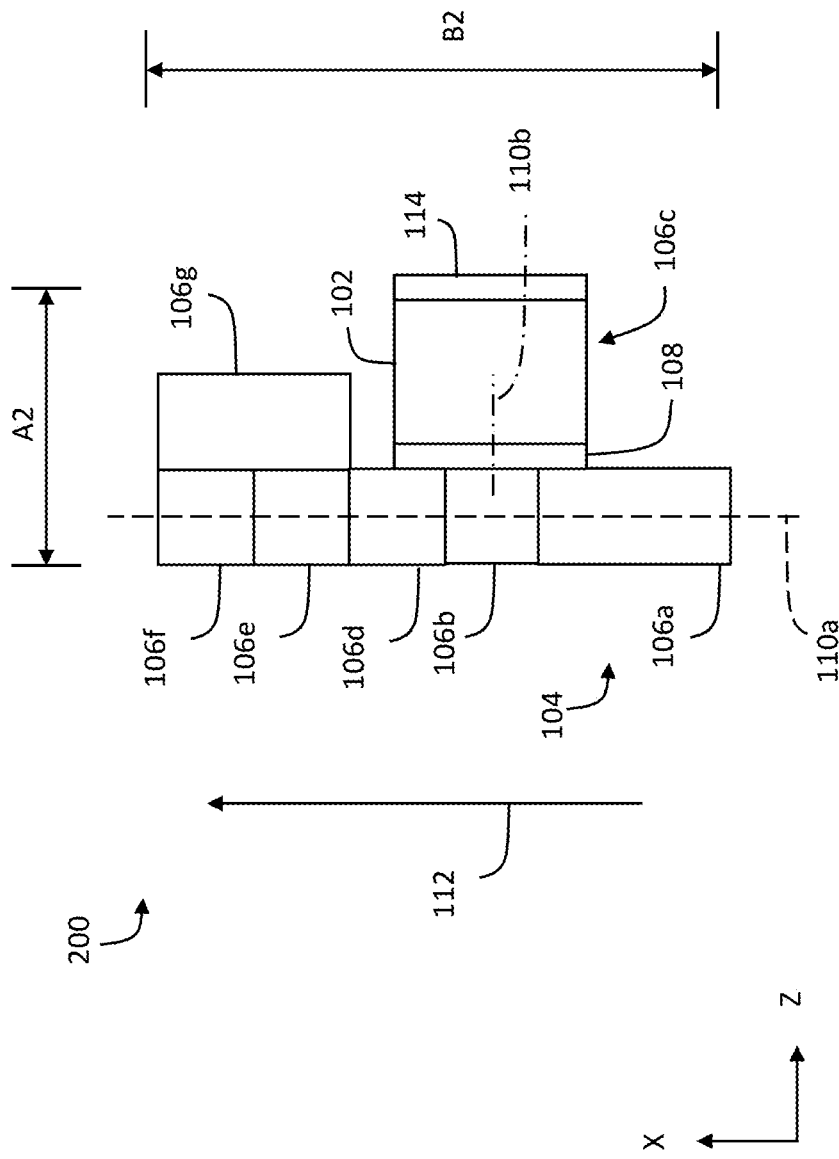
FIG. 2 is a top plan view of a scanning system, according to one exemplary embodiment.

The illustrative embodiment of FIG. 2 differs from the illustrative embodiment of FIG. 1 in that scanning system 200 comprises fifth conveyor segment 106e, sixth conveyor segment 106f, and seventh conveyor segment 106g.

Fifth conveyor segment 106e is a conveyor segment configured to move articles to one of two retrieval locations. Fifth conveyor segment 106e may be a bidirectional conveyor, configured to move articles in both the X and Z directions. For example, conveyor segment 106e may be configured to move articles to either an owner retrieval location such as conveyor segment 106f or an operator retrieval location such as conveyor segment 106g, depending on the results of an article scan and whether the article is to be searched by an operator. By using two retrieval locations, throughput of scanning system 200 may be increased.

Scanning system 200 has a width A2 and a length B2. In some embodiments, width A2 may be approximately 8.5 feet or less. In some embodiments, length B2 may be approximately 16 feet or less.

Figure 3:
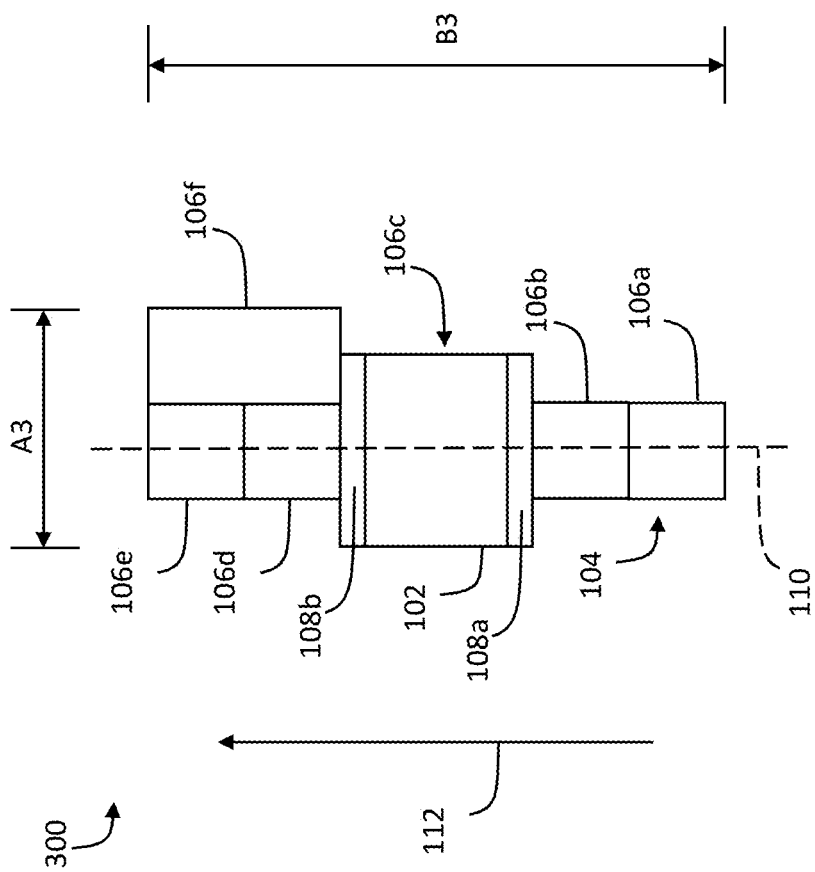
FIG. 3 is a top plan view of a scanning system, according to one exemplary embodiment.

The illustrative embodiment of FIG. 3 differs from the illustrative embodiment of FIG. 2 in that scanning system 300 includes a scanner 102 having a first article opening 108a and a second article opening 108b arranged along axis 110, and in that conveyor assembly 104 is configured to move articles along axis 110. Axis 110 is arranged along the X direction. In the illustrative embodiment of FIG. 3, the conveyor assembly 104 is configured to move articles along a same axis that the first article opening 108a and the second article opening 108b are arranged along.

In some embodiments, fourth conveyor segment 106d may be a bidirectional conveyor configured to move articles to either fifth conveyor segment 106e, which may be an owner retrieval location, or sixth conveyor segment 106f, which may be an operator retrieval location.

Scanning system 300 has a width A3 and a length B3. In some embodiments, width A3 may be approximately 6 feet or less. In some embodiments, length B3 may be approximately 18.5 feet or less.

Figure 4B:
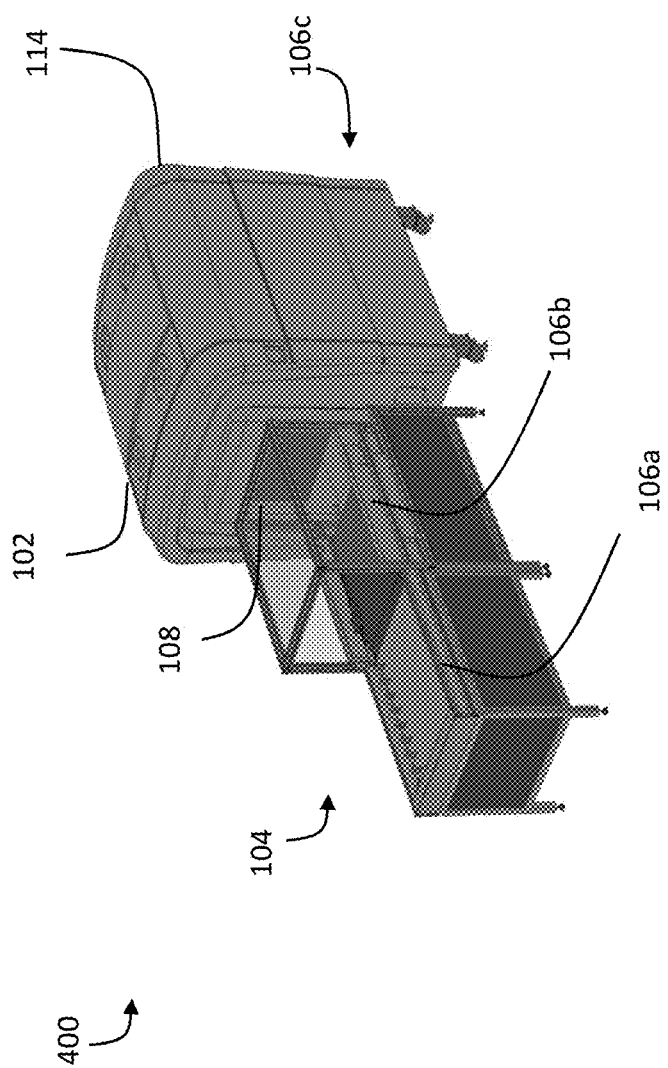
FIG. 4B is a perspective view of a scanning system according to the exemplary embodiment of FIG. 4A.

The illustrative embodiment of FIGS. 4A and 4B differs from the illustrative embodiment of FIG. 3 in that scanning system 400 includes a scanner 102 having only a single article opening, article opening 108.

In FIGS. 4A and 4B, the conveyor assembly 104 is configured to move articles into and out of the scanner 102 via the single article opening, article opening 108, along the axis 110.

The scanner 102 further comprises a shield 114 arranged at a side of the scanner 102 opposite from the article opening 108. Shield 114 is configured to block X-rays from leaving the scanner 102. In some embodiments, the shield 114 is removable from scanner 102. For example, shield 114 may plug an additional article opening when the additional article opening is not in use. A shield being removable from a scanner may allow a scanning system to be reconfigured into two or more scanning arrangements.

Scanning system 400 has a width A4 and a length B4. In some embodiments, width A4 may be approximately 5 feet or less. In some embodiments, length B4 may be approximately 12 feet or less.

Figure 5B:
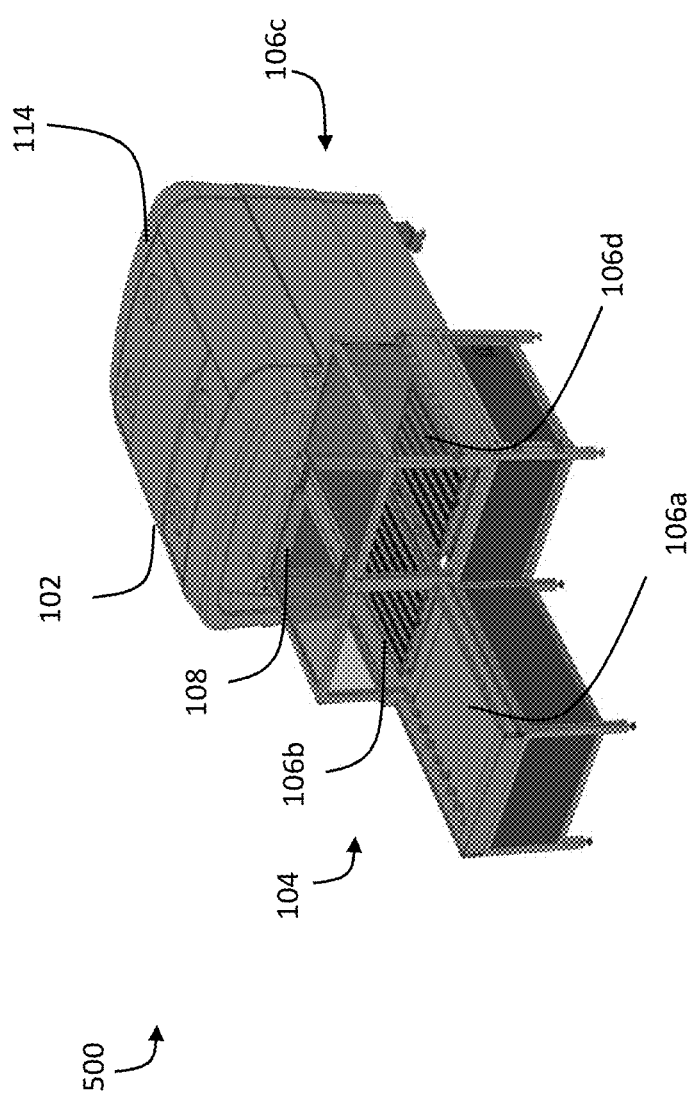
FIG. 5B is a perspective view of a scanning system according to the exemplary embodiment of FIG. 5B.

The illustrative embodiment of FIGS. 5A and 5B differs from the illustrative embodiment of FIGS. 4A and 4B in that scanning system 500 further includes a fourth conveyor segment 106d, which may be used as an article holding area.

Additionally, in FIGS. 5A and 5B, second conveyor segment 106b may be a bidirectional conveyor, configured to move articles in both the X and Z directions. In some embodiments, an article may be held at conveyor segment 106d while an operator is analyzing a scan of the article. Alternatively or additionally, second conveyor 106d may be used as an article retrieval area. Accordingly, throughput of scanning system 500 is increased, because an article does not need to be completely removed from first conveyor segment 106a and second conveyor segment 106b before a new article can be moved into scanner 102.

Scanning system 500 has a width A5 and a length B5. In some embodiments, width A5 may be approximately 6 feet or less. In some embodiments, length B5 may be approximately 12 feet or less.

Figure 6A:
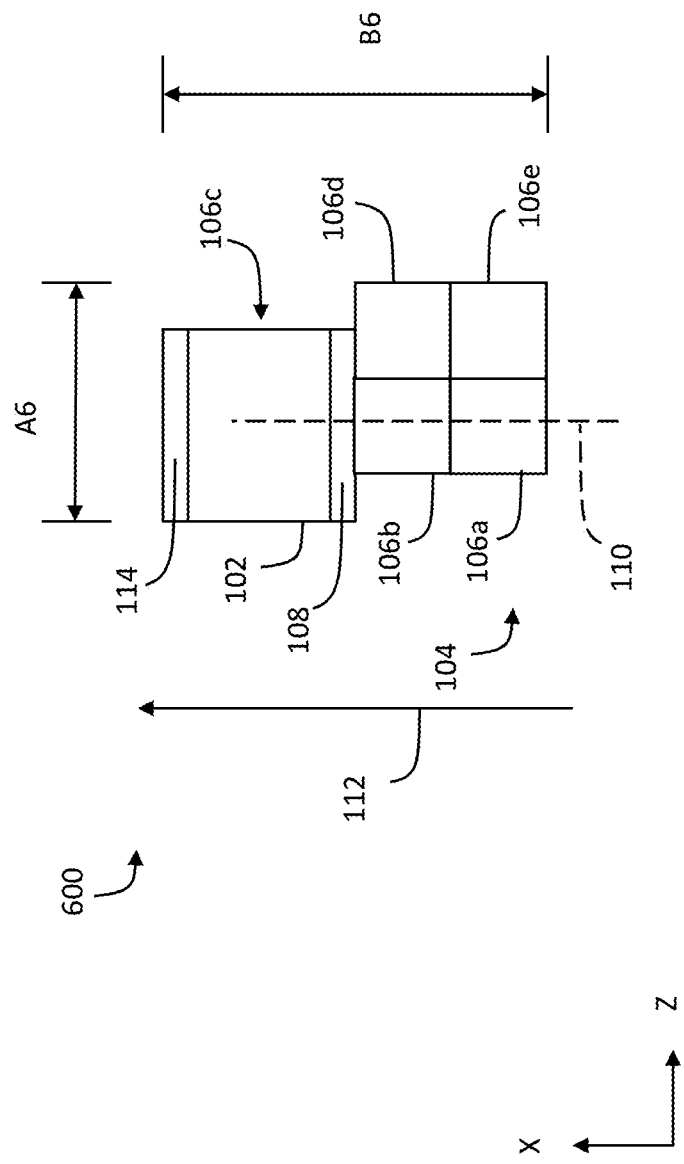
FIG. 6A is a top plan view of a scanning system, according to one exemplary embodiment.
Figure 6B:
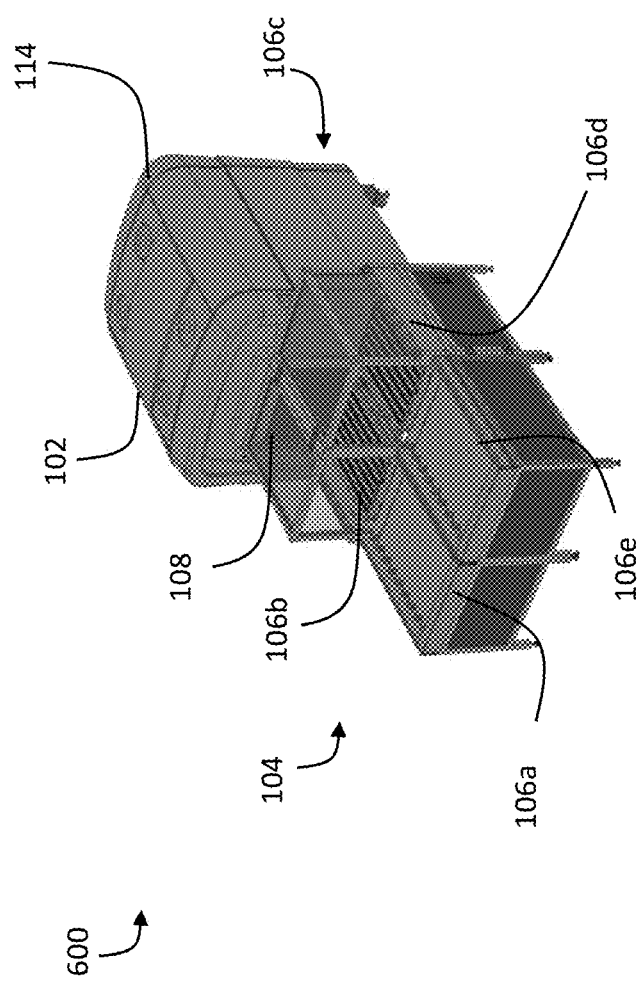
FIG. 6B is a perspective view of a scanning system according to the exemplary embodiment of FIG. 6A.

The illustrative embodiment of FIGS. 6A and 6B differs from the illustrative embodiment of FIGS. 5A and 5B in that scanning system 600 further includes a fifth conveyor segment 106e.

Fifth conveyor 106e can be configured to provide a second path for moving articles into and out of scanner 102. For example, as a first article is being scanned and a second article is being held at conveyor segment 106d, a third article may be held at first conveyor segment 106a, ready to be moved into the scanner 102 once the second article is moved to fifth conveyor segment 106e and the first article is moved to be held at fourth conveyor segment 106d. Accordingly, throughput of scanning system 600 may be increased by providing an additional path for moving articles into scanner 102 and by providing an additional holding area.

Scanning system 600 has a width A6 and a length B6. In some embodiments, width A6 may be approximately 6 feet or less. In some embodiments, length B6 may be approximately 12 feet or less.

Figure 7A:
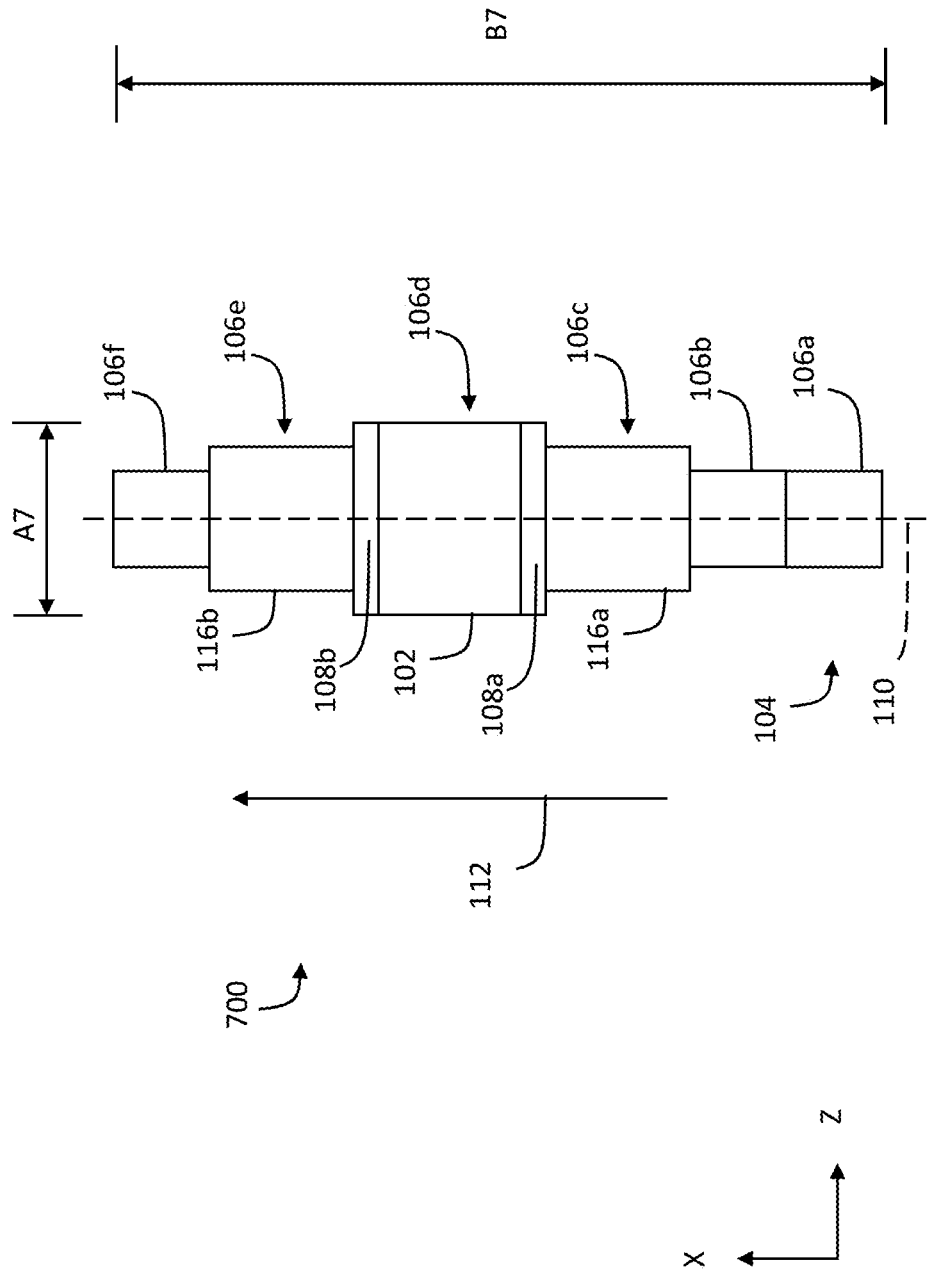
FIG. 7A is a top plan view of a scanning system, according to one exemplary embodiment.
Figure 7B:
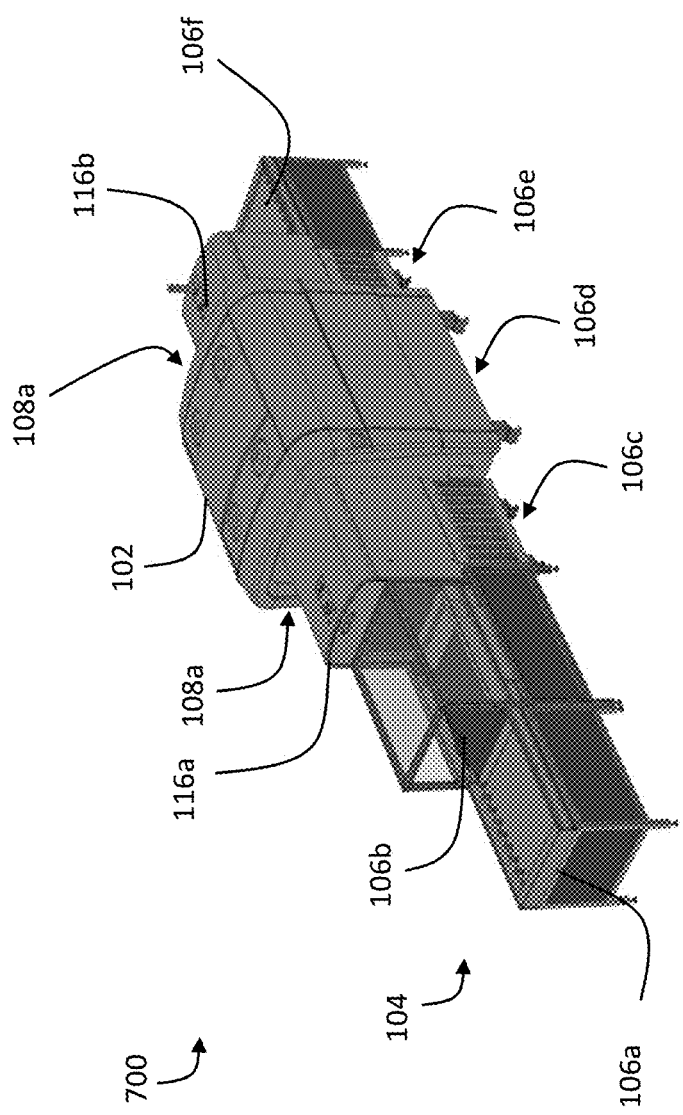
FIG. 7B is a perspective view of a scanning system according to the exemplary embodiment of FIG. 7A.

The illustrative embodiment of FIGS. 7A and 7B differs from the illustrative embodiment of FIG. 3 in that scanning system 700 further includes a first shielded tunnel 116a, a second shielded tunnel 116b, and scanner 102 is not configured to suspend scanning when articles are moving into and out of scanner 102.

Third conveyor segment 106c is disposed in shielded tunnel 116a, and fifth conveyor segment 106e is disposed in shielded tunnel 116b. Shielded tunnel 116a and shielded tunnel 116b may include shield curtains that prevent X-rays from exiting.

Fifth conveyor segment 106e may be configured to hold a first article in shielded tunnel 116b while an operator is analyzing a scan of the first article. For example, the fifth conveyor segment 106e may be configured to hold a first article in shielded tunnel 116b while a second article is being scanned by scanner 102. This may be achieved by using separately controllable conveyor segments for the fifth conveyor segment 106e and other conveyor segments, such as fourth conveyor segment 106d. In some conventional scanning systems that do not have separately controllable conveyor segments, the entire conveyor assembly must be halted, or an article must be held in a dedicated holding area outside a shielded tunnel while an operator analyzes a scan of the article. By using separately controllable conveyor segments to hold an article in a shielded tunnel while another article is being scanned, the throughput of the scanning system 700 may be increased, because other conveyor segments may continue to move articles. Further, the length of scanning system 700 may be decreased, because no dedicated article holding area is required.

Shielded tunnel 116b may include at least one indicator that provides a status of an article held in the shielded tunnel 116b, as described above.

Third conveyor segment 106c may be configured to hold a first article in shielded tunnel 116a while a second article is being scanned by scanner 102. Accordingly, the second article can be held ready for scanning as soon as possible, increasing throughput of scanning system 700.

Scanning system 700 has a width A7 and a length B7. In some embodiments, width A7 may be approximately 5 feet or less. In some embodiments, length B7 may be approximately 18.5 feet or less.

A scanning system may be reconfigurable into at least two scanning arrangements. A scanning arrangement may be a distinct physical arrangement of the components of the scanning system in which scans of articles may be taken. For example, in two different scanning arrangements, the components of the scanning systems described above, such as scanners, conveyor assemblies, conveyor segments, article openings, and shields may be disposed in two different physical locations with respect to each other. For example, a scanning system may be reconfigurable between at least two of scanning system 100, scanning system 200, scanning system 300, scanning system 400, scanning system 500, scanning system 600, scanning system 700, or further still scanning systems. The components of these scanning systems, as discussed above, such as scanners, conveyor assemblies, conveyor segments, article openings, and shields, may be configured to facilitate the rearrangement of a scanning system, for example, by having modular connection points.

By providing a scanning system reconfigurable into at least two scanning arrangements, the scanning system may be reconfigured into an arrangement required to fit a particular environment. For example, some environments may require a particular size or shape scanning system or may require a particular throughput of a scanning system. An appropriate arrangement may therefore be selected by an operator and the scanning system may be rearranged to that selected arrangement.

Figure 8:
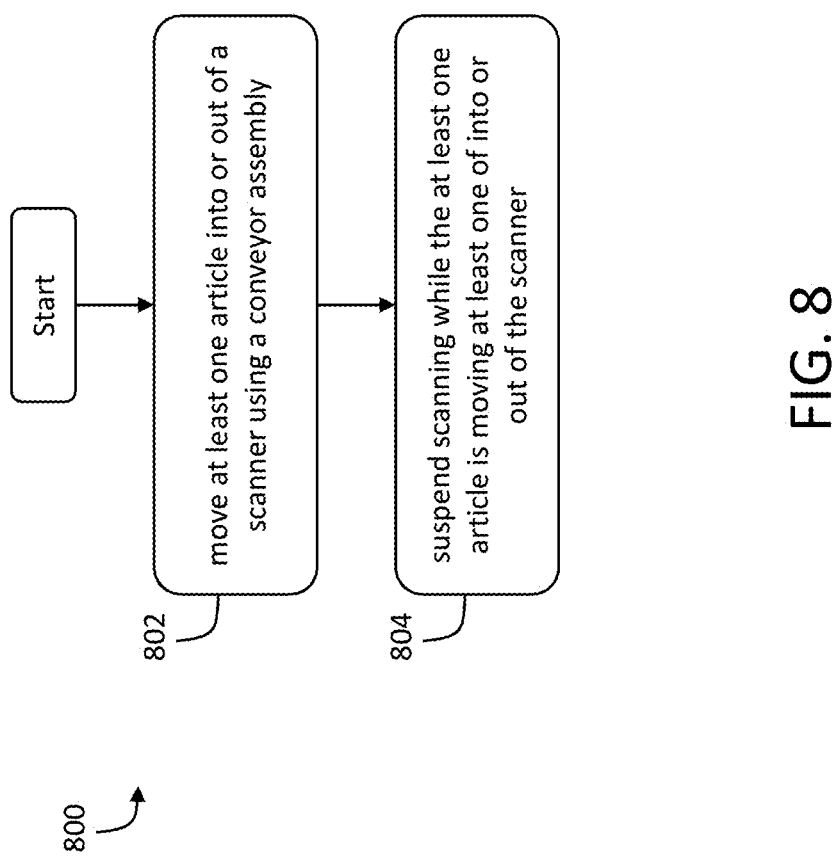
FIG. 8 is a process flow for a method of scanning, according to one exemplary embodiment.

FIG. 8 shows a process flow 800 for a method of scanning according to an exemplary embodiment. Process flow 800 comprises step 802 and step 804. Step 802 comprises moving at least one article into or out of a scanner using a conveyor. Step 804 comprises suspending scanning while the at least one article is moving at least one of into or out of the scanner. By suspending scanning while the at least one article is moving at least one of into or out of the scanner, the need for a shielded tunnel at an article opening of the scanner may be eliminated, allowing the size of a scanning system to be reduced.

Figure 9:
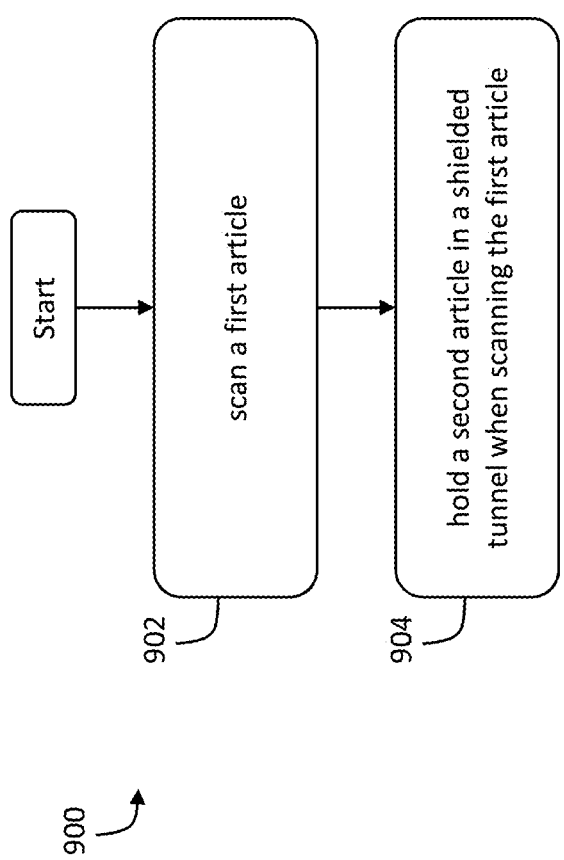
FIG. 9 is a process flow for a method of scanning, according to one exemplary embodiment.

FIG. 9 shows a process flow 900 for a method of scanning according to an exemplary embodiment. Process flow 900 comprises step 902 and step 904. Step 902 comprises scanning a first article. Step 904 comprises holding a second article in a shielded tunnel when scanning the first article. By holding the second article in the shielded tunnel when scanning tunnel, the need to halt an entire conveyor assembly may be eliminated, increasing throughput of a scanning system. Further, the need for a dedicated article holding area may be eliminated, allowing the size of the scanning system to be reduced.

Figure 10:
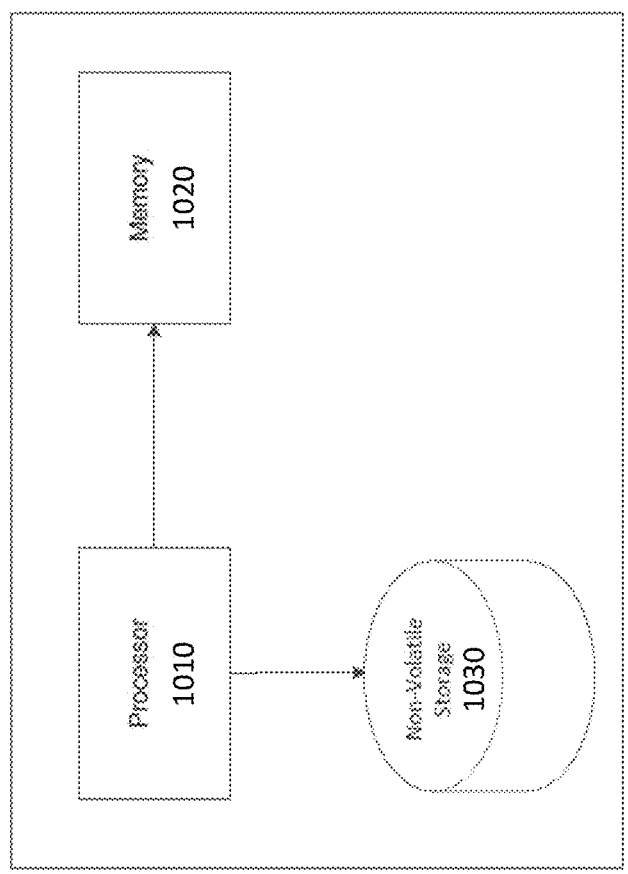
FIG. 10 is a block diagram of a computer system on which various functions can be implemented.

An illustrative implementation of a computer system 1000 that may be used in connection with any of the embodiments of the disclosure provided herein is shown in FIG. 10. The computer system 1000 may include one or more processors 1010 and one or more articles of manufacture that comprise non-transitory computer-readable storage media, for example, memory 1020 and one or more non-volatile storage media 1030. The processor 1010 may control writing data to and reading data from the memory 1020 and the non-volatile storage device 1030 in any suitable manner. To perform any of the functionality described herein, for example, scanner control, conveyor segment control, etc., the processor 1010 may execute one or more processor-executable instructions stored in one or more non-transitory computer-readable storage media, for example the memory 1020, which may serve as non-transitory computer-readable storage media storing processor-executable instructions for execution by the processor 1010. For example, scanning systems described herein may include at least one computer system 1000 configured to control conveyor assemblies, scanners, and/or other components of the scanning system.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various concepts of the disclosure may be embodied as one or more methods, of which examples, for example, the methods described with reference to FIG. 8 and FIG. 9, have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A scanning system comprising:
a conveyor assembly;
a scanner comprising at least one emitter; and
at least one processor configured to:
control the conveyor assembly to move at least one article at least one of into or out of the scanner; and
control the scanner to, while the conveyor assembly is moving the at least one article at least one of into or out of an article opening of the scanner, suspend scanning, wherein suspending scanning comprises controlling radiation emission of the at least one emitter, wherein:
the scanner further comprises at least one shield curtain;
the at least one article displaces the at least one shield curtain when the conveyor assembly moves the at least one article into or out of the article opening of the scanner; and
the at least one processor is configured to suspend scanning while the at least one article displaces the at least one shield curtain.

2. The scanning system of claim 1, wherein:
the emitter comprises at least one X-ray emitter;
the at least one processor is configured to control the scanner to turn off the at least one X-ray emitter to suspend radiation emission.

3. The scanning system of claim 2, wherein:
the at least one processor is configured to control the scanner to turn off the at least one X-ray emitter while the at least one article displaces the at least one shield curtain.

4. The scanning system of claim 1, further comprising a sensor, wherein the at least one processor is configured to determine a position of the at least one article using the sensor.

5. The scanning system of claim 4, wherein the at least one processor is configured to determine when to suspend scanning using the position of the at least one article determined using the sensor.

6. The scanning system of claim 1, wherein:
the conveyor assembly is configured to move the at least one article along a first axis;
the scanner comprises an article opening arranged along a second axis; and
the first axis is not parallel to the second axis.

7. The scanning system of claim 6, wherein the first axis is perpendicular to the second axis.

8. The scanning system of claim 1, wherein:
the article opening is configured for articles to move at least one of into or out of the scanner via the article opening;
the article opening is a single opening of the scanner; and
the conveyor assembly is configured to move the at least one article into and out of the scanner via the article opening.

9. The scanning system of claim 8, wherein the scanner comprises a removable shield arranged on a side of the scanner opposite to the article opening, the removable shield plugging an additional article opening.

10. The scanning system of claim 1, wherein:
the conveyor assembly is configured to move the at least one article along a first axis; and
the scanner comprises:
a first article opening arranged along the first axis; and
a second article opening arranged along the first axis.

11. A scanning system comprising:
a scanner;
a shielded tunnel;
a conveyor assembly configured to move at least one article; and
at least one processor configured to:
control the conveyor assembly to hold a first article in the shielded tunnel when the scanner scans a second article,
wherein the at least one processor is configured to determine when to hold the first article in the shielded tunnel using a sensed position of at least one of the first article or the second article.

12. The scanning system of claim 11, further comprising a sensor, wherein the at least one processor is configured to determine the sensed position of the at least one of the first article or the second article using the sensor.

13. The scanning system of claim 11, wherein the at least one processor is configured to control the conveyor assembly to move the first article from the shielded tunnel directly to an uncovered portion of the scanning system, the uncovered portion being configured to allow retrieval of the article by an owner of the article.

14. The scanning system of claim 11, further comprising an indicator, wherein the at least one processor is configured to control the indicator to provide a status of the first article held in the shielded tunnel to an operator of the scanning system.

15. A scanning system comprising:
a conveyor assembly configured to move articles along a first axis; and
a scanner comprising at least one article opening arranged along a second axis,
wherein the scanning system is reconfigurable between a first scanning arrangement and a second scanning arrangement,
the scanning system further comprising at least one processor configured to control the conveyor assembly and the scanner, wherein, in the first scanning arrangement;
the at least one processor is configured to:
control the conveyor assembly to move at least one article at least one of into or out of the scanner; and
control the scanner to, while the conveyor assembly is moving the at least one article at least one of into or out of an article opening of the scanner, suspend scanning, wherein suspending scanning comprises controlling radiation emission of the scanner; and
the scanner further comprises at least one shield curtain;
the at least one article displaces the at least one shield curtain when the conveyor assembly moves the at least one article into or out of the article opening of the scanner; and
the at least one processor is configured to suspend scanning while the at least one article displaces the at least one shield curtain.

16. The scanning system of claim 15, wherein, in the second scanning arrangement, the at least one processor is configured to control the conveyor assembly to hold a first article in a shielded tunnel when the scanner scans a second article.

17. The scanning system of claim 15, wherein:
the first axis is parallel to the second axis in one of the first scanning arrangement or the second scanning arrangement; and
the first axis is not parallel to the second axis in another of the first scanning arrangement or the second scanning arrangement.

18. The scanning system of claim 15, wherein:
the scanner comprises a single article opening in one of the first scanning arrangement or the second scanning arrangement; and
the scanner comprises a first article opening and a second article opening in another of the first scanning arrangement or the second scanning arrangement.

19. The scanning system of claim 15, wherein:
the scanning system comprises a shielded tunnel coupled to the at least one article opening in the second scanning arrangement; and
the scanning system does not comprise a shielded tunnel coupled to the at least one article opening in the first scanning arrangement.

\* \* \* \* \*